Sept. 23, 1924.

T. A. DICKS

PROPELLER

Filed Sept. 1, 1923

1,509,804

2 Sheets-Sheet 1

WITNESSES
J. Herbert Bradley.

INVENTOR
Thomas A. Dicks
by Darwin S. Wolcott
Atty

Sept. 23, 1924.

T. A. DICKS

PROPELLER

Filed Sept. 1, 1923

1,509,804

2 Sheets-Sheet 2

WITNESSES
J. Herbert Bradley

INVENTOR
Thomas A. Dicks
by Dannie S. Wolcott
atty

Patented Sept. 23, 1924.

1,509,804

UNITED STATES PATENT OFFICE.

THOMAS A. DICKS, OF PITTSBURGH, PENNSYLVANIA, ASSIGNOR TO STANDARD STEEL PROPELLER COMPANY, OF PITTSBURGH, PENNSYLVANIA, A CORPORATION OF PENNSYLVANIA.

PROPELLER.

Application filed September 1, 1923. Serial No. 660,627.

*To all whom it may concern:*

Be it known that I, THOMAS A. DICKS, residing at Pittsburgh, in the county of Allegheny and State of Pennsylvania, a subject of Great Britain, have invented or discovered certain new and useful Improvements in Propellers, of which improvements the following is specification.

The invention described herein relates to certain improvements in propellers for aeroplanes and has for its object a construction whereby the blades may be detachably and adjustably secured to a hub having all its parts or members formed integral one with the other. The invention is hereinafter more fully described and claimed.

Figure 1:
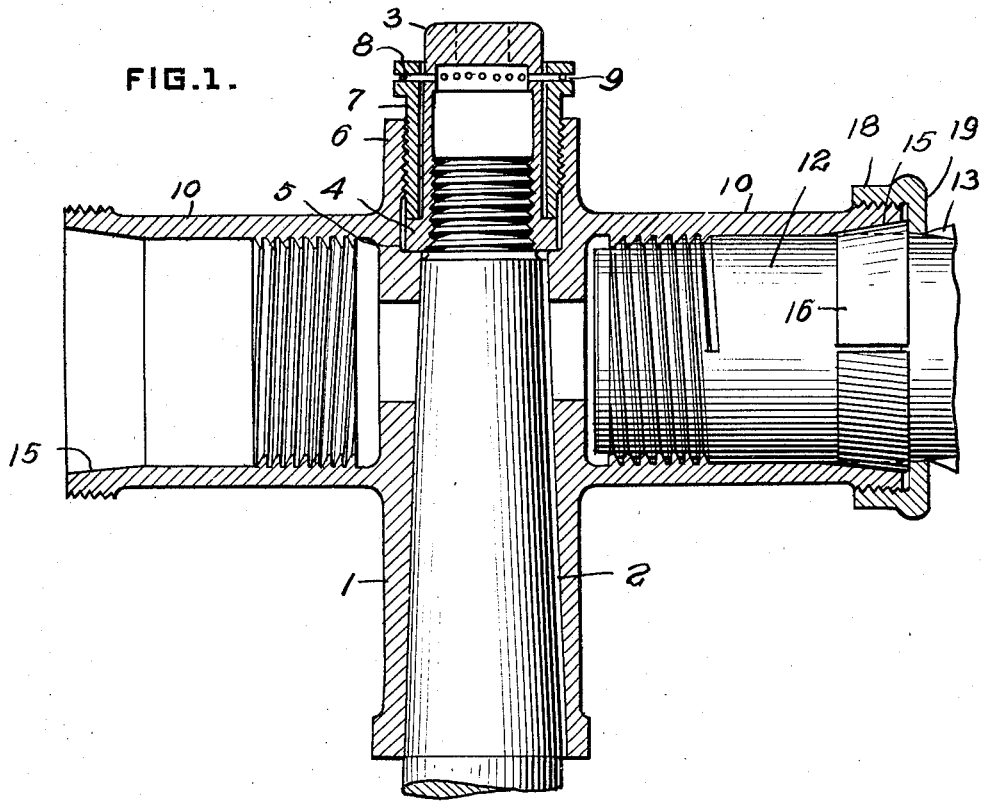
Figure 2:
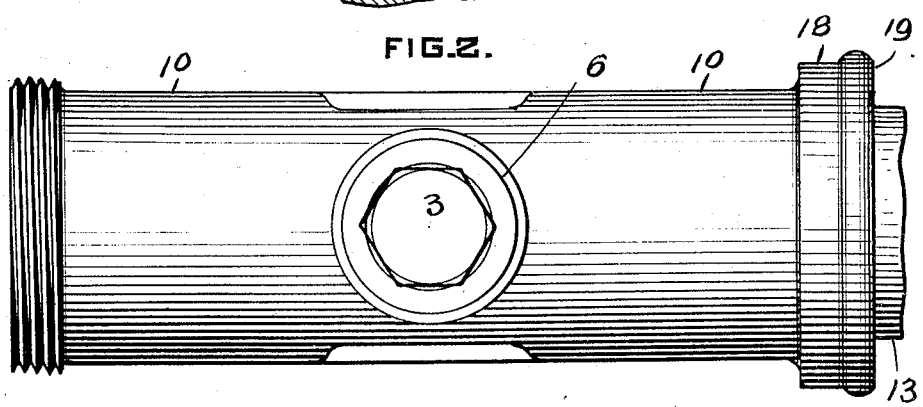
Figure 3:
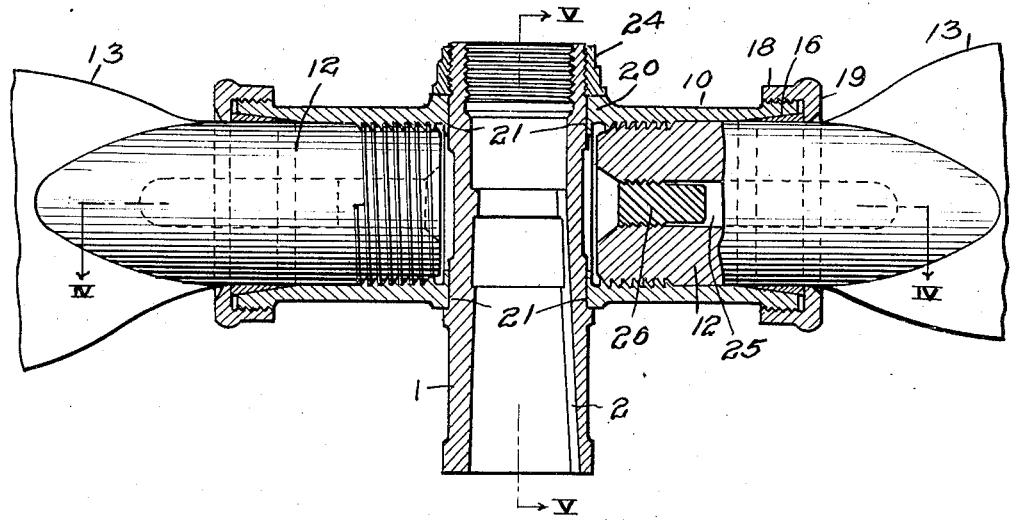
Figure 4:
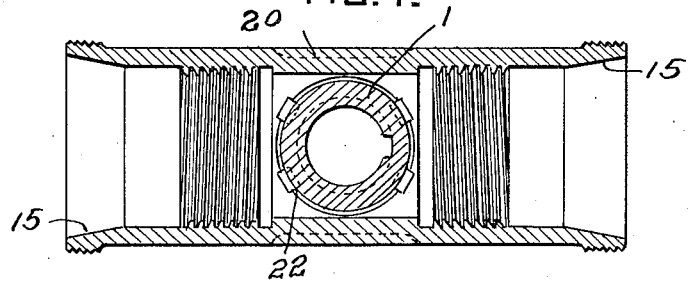
Figure 5:
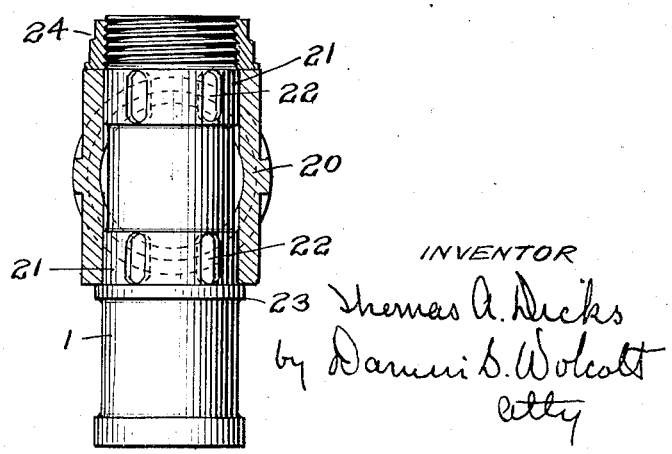

In the accompanying drawings forming a part of this specification, Fig. 1 is a sectional plan view of propeller hubs and blades embodying the invention described and claimed herein; Fig. 2 is an end view of the device shown in Fig. 1; Fig. 3 is an end view similar to Fig. 1 illustrating a modification; Figs. 4 and 5 are sections on planes indicated by the lines IV—IV and V—V, Fig. 3.

In the practice of the invention the hub 1 is formed with a tapering passage therethrough for the reception of the correspondingly shaped end of the shaft and the hub and shaft are locked together as against rotation by the key 2. The end of the shaft is threaded and on this threaded end is screwed an annular nut 3 having a diameter substantially less than that of the outer end of the hub and provided at its lower end with an enlargement 4, adapted to engage and bear against a shoulder 5 in the hub. In screwing this annular nut onto the shaft, the enlargement will bear against the shoulder and the continued rotation of the nut will draw the shaft firmly into its seat within the hub. The enlarged outer end 6 of the hub is internally threaded for the reception of an externally threaded sleeve 7 which screws into this enlargement and bears at its lower end against the enlargement 4 on the nut 3, thereby locking the nut in position. The nut and sleeve are held together as against independent rotation by a pin 8 passing through a hole in the sleeve and into one of a plurality of holes in the nut and preferably formed integral with a split ring 9 fitting in a groove in the sleeve, as clearly shown in Fig. 1.

It is the usual practice to secure the stems of propeller blades in sockets projecting laterally from the hubs by screwing the stems into the sockets. It has been found in practice that in such a construction the vibration of the blades due to their rapid rotation, will not synchronize with the vibrations of the hub, and hence will cause a rupture of the stems on a transverse plane coincident with one of the threads, usually the outer thread. It has been attempted to prevent the independent vibrations of the threaded portions of the stems by locating the threads on portions of the stems intermediate their ends and so constructing the portions of the stems and sockets at opposite ends of the threaded portions, that the walls of the sockets will bear on the stem. But such construction has been found inefficient.

In the construction shown herein the hub 1 is provided with sockets 10 arranged at right angles to the axis of the hub. These sockets may be formed integral with the hub, as shown in Figs. 1 and 2, or separable therefrom, as shown in Figs. 3, 4, and 5. In order to hold the blades 13 as against longitudinal movement, threads are formed on the stems 12 adjacent to their inner ends, said threads being adapted to engage corresponding threads formed in the sockets adjacent to the inner ends of the latter. The stems and sockets are made of such lengths as to provide contact surfaces, the surface on the stem being intermediate the threaded portions and the blades, and the surface in the sockets being intermediate the threaded portions and the ends of the sockets. As the stems must rotate in the sockets when being screwed into position, the latter must be made slightly larger than the external diameter of the stems, and although such difference between the diameters of the stems and sockets is slight, it is sufficient to permit independent vibrations of the stems.

In order to prevent such vibration, practically solid bearings are interposed between the sockets and portions of the stems intermediate the blades and the threaded portions. Such solid bearings can be conveniently formed by flaring the sockets at their outer ends as indicated at 15, and then forcing sleeves 16 wedge shaped in cross section between the sockets and the stems. The sleeves are made with an external taper and with an internal diameter sufficiently larger than the diameters of the stems to permit of their being slid onto the stems before the latter are screwed into the sockets. The sleeves are split as shown at 17 so that when formed in between the sockets and stems they solidly grip the stems. Convenient means for forcing the sleeves to position consists of internally threaded collars 18 adapted to be screwed into the sockets and provided with inwardly projecting flanges 19 adapted to bear on the outer ends of the sleeves. The collars and sleeves are slipped onto the stems before the latter are screwed into position.

It has been found that by forcing the sleeve between the sockets and stems, practically solid bearings are formed between such parts so that the vibrations of the blade and stem will be transmitted to the sockets and hubs. As the sleeves 16 are tightly wedged between the stems and sockets, they operate to lock the stems as against rotation.

In lieu of forming the arms, having the sockets for the reception of the blades, integral with the hub, they may be formed on a band 20 adapted to be tightly fit around the hub, as shown in Figs. 3, 4, and 5. In the construction shown herein, the hub is provided with two peripheral seats or bearings 21 for the band and the latter is held for rotation on the hubs by keys 22, which may be formed integral with the hub. The band is held in position longitudinally of the hub by a collar 23 on the hub and by a nut 24 screwing onto the threaded outer end of the hub.

As is well understood in the art, the sockets and blades should be symmetrical as a slight difference in weight between the several sockets and blades would produce destructive strains at the high speeds at which the propeller is driven. It is nearly impossible to make the sockets and blades of exactly the same weight and hence provision is made for increasing the weight of a socket or blade. A convenient means for weighting one of the sockets and blades consists in drilling a hole 25 axially of the stem of the blade for the reception of a counterweight. It is preferred to internally thread such hole, the threads being of small pitch, so that a plug 26 may be screwed thereinto. The plug is preferably made of soft metal as lead, so that it will not be necessary to cut threads thereon.

I claim herein as my invention:

1. A propeller having in combination a hub having sockets extending radially therefrom, said sockets being internally threaded adjacent to their inner ends, blades having stems having their end portions threaded, and means whereby a solid bearing may be formed between the sockets and stems at points beyond the threaded portions of said parts.

2. A propeller having in combination a hub, sockets extending radially from the hub and internally threaded adjacent to their inner ends and having an outwardly flaring portion adjacent to their outer ends, blades provided with stems externally threaded adjacent to their ends, a split sleeve wedge shaped in cross-section interposed between the sockets and stems, and means for forcing said sleeves to positions where they will bear solidly on the sockets and stems.

3. A propeller having in combination a hub, sockets extending radially from the hub and internally threaded adjacent to their inner ends and having cylindrical and outwardly flaring portions beyond the threaded portion, blades having stems externally threaded adjacent to their ends and cylindrical portions intermediate the blades and the threaded portion, split sleeves wedge-shaped in cross-section slidably mounted on the stems and means for forcing the sleeves between the stems and the flaring portions of the sockets.

4. A propeller having in combination a hub, a band provided with radially arranged sockets fitting on the hub, said sockets being internally threaded adjacent to their inner ends and outwardly flaring adjacent to their outer ends, blades provided with stems having their ends externally threaded, split sleeves wedge-shape in cross-section slidably mounted on the stems and means for forcing the sleeves between the stems and flaring portions of the sockets.

5. A propeller having in combination a hub, radially disposed sockets carried by the hub, blades provided with stems removably secured in the sockets, the stems being provided with axial openings extending from their inner ends for the reception of counter weights.

6. A propeller having in combination a hub, radially disposed sockets carried by the hub, blades provided with stems removably secured in the sockets, the stems being provided with internally threaded axial openings extending from their inner ends for the reception of counterweights.

In testimony whereof, I have hereunto set my hand.

THOMAS A. DICKS.